United States Patent Office 3,432,518
Patented Mar. 11, 1969

3,432,518
POLYMER HYDROGENATION
Lyle R. Kallenbach, College Station, Tex., assignor to Phillips Petroleum Company, a corporation of Delaware
No Drawing. Filed June 27, 1966, Ser. No. 560,816
U.S. Cl. 260—94.9    9 Claims
Int. Cl. C08f 43/03; B01j 11/84

ABSTRACT OF THE DISCLOSURE

Unsaturated polymers and copolymers of 1-olefins are hydrogenated in the presence of a catalyst consisting of (a) a metal, metal hydride or organometal compound of Groups I–A, II–A or III–A and (b) a Group VIII metal salt of a hydrocarbon-substituted phosphorus acid. A preferred catalyst is triisobutylaluminum and nickel diphenyl phosphinate.

---

This invention relates to a process of hydrogenating unsaturated polymers and copolymers of 1-olefins.

In another aspect, this invention relates to a method of hydrogenating unsaturated polymers and copolymers of 1-olefins using a two-component organo-metal system.

In one of its more specific aspects, this invention relates to a method of hydrogenating polymers and copolymers of 1-olefins using a two-component catalyst such as triisobutylaluminum and nickel diphenyl phosphinate.

It is an object of this invention to provide an improved method of hydrogenating unsaturated polymers and copolymers of 1-olefins. It is another object of this invention to provide polymers with improved physical property characteristics.

It is another object of this invention to provide a polymer hydrogenation catalyst that is more easily separated from the hydrogenated polymer than are the catalysts of the art.

Other objects, aspects and advantages of the present invention will be evident to persons skilled in the art upon a study of the specification and the appended claims.

The olefin polymers and copolymers for use in this invention include both those made by the process of Hogan et al. (U.S. 2,825,721) and those made with the well-known organometal catalysts systems. The polymers are prepared from 1-olefins, preferably the $C_2$ to $C_8$ 1-olefins such as ethylene, propylene, butene-1, pentene-1, octene-1, 3-methylbutene-1, 4-methylpentene-1, and copolymers thereof or copolymers containing 1 to 10 weight percent other 1-olefins such as 1,3-butadiene, isoprene, 1,4-pentadiene, and the like.

The polymer to be hydrogenated can be prepared in solution, or dissolved in a hydrocarbon solvent, subsequent to preparation in non-solvent or emulsion systems. The hydrocarbon solvent used can be selected from the paraffins, cycloparaffins, and aromatics, or mixtures thereof, in which the polymer being hydrogenated in soluble. Examples of solvents that can be used are n-pentane, n-octane, cyclohexane, benzene, toluene, and the like, as well as mixtures thereof. Polymer concentration in the solvent can be varied from saturation to as low as 1 weight percent, and is preferably in the range of 5 to 25 weight percent.

The present invention discloses a method of hydrogenating unsaturated polymers and copolymers of 1-olefins, exemplified by the above compounds, by the action of a two-component catalyst. Said catalyst consists of a first component of the general formula $MR_m$ wherein M is a Group I–A, II–A or III–A metal of the Periodic System shown on page B-2 of the Handbook of Chemistry and Physics, 45th Edition, published by the Chemical Rubber Company in 1964; each R is selected from the group consisting of hydrogen, aryl, cycloalkyl or alkyl groups, or combinations thereof, such as alkaryl, aralkyl, and the like, having 1 to 20 carbon atoms; and m is either zero or the valence of M. Some typical compounds of this general formula are triethylaluminum, triisobutylaluminum, tridecylaluminum, trieicosylaluminum, dicyclohexyl(phenyl)aluminum, 1-anthrylpotassium, di-3-phenanthrylberyllium, n-butyllithium, dimethylmagnesium, di-n-propylbarium, tri-n-pentylgallium, diisobutylaluminum hydride, sodium hydride, aluminum hydride, lithium, potassium, magnesium, aluminum, benzylrubidium, di(6-cyclohexyl-1-phenanthryl)strontium, tricyclopentylindium, tri(3,6-diisopentyl-1-naphthyl)thallium, 3,5-diethylcyclohexylsodium, di(5,10-dicyclopentyldecyl)magnesium, 3-phenylcyclohexyllithium, and the like.

The second component of the catalyst system is a Group VIII metal salt of a substituted phosphorus acid selected from the group consisting of

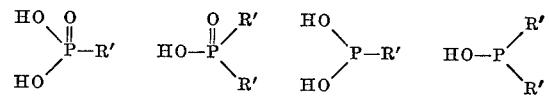

wherein R' is a member of the group consisting of alkyl, cycloalkyl and aryl groups or combinations thereof, such as aralkyl, alkaryl, and the like, having 1 to 20 carbon atoms and which are not necessarily the same. The Group VIII metal salt of the substituted phosphorus acid is preferably the iron, cobalt, nickel, palladium or platinum salt. The metal salt can be prepared, for example, by reacting the metal hydroxide or metal carbonate with the substituted phosphorus acid to eliminate water or carbonic acid. Examples of metal salts that can be used are nickel diphenylphosphinate, iron eicosylphosphonate, cobalt 1-phenanthrylphosphonite, ruthenium dicyclohexylphosphinate, rhodium dibenzylphosphinite, palladium 4-hexyl-1-anthryl-phosphonate, osmium di(4-tetradecylcyclohexyl)phosphinate, iridium 7-cyclopentylpentadecylphosphonite, platinum di(2-phenylcyclohexyl)phosphinite, iron 3-cyclopentyl-naphthylphosphonate, cobalt diphenylphosphinate, nickel phenylphosphonite, nickel diphenylphosphinite, and the like.

The hydrogenation catalyst are prepared by admixing the Group I–A, II–A or III–A metal compound, hereinafter known as the first component, with the Group VIII metal salt, hereinafter known as the second component, in the solvent to be used for the hydrogenation preferably in the absence of poisons such as oxygen, water, and the like. The mole ratio of the first component to the metal of the second component is usually in the range of 1:1 to 10:1, preferably 2:1 to 5:1. The concentration of the two-component catalyst in the reaction zone is usually in the range of 0.01 to 10 weight percent of the polymer being hydrogenated although amounts outside this range are operable.

Operating temperature is in the range of 50 to 500° F., preferably 200 to 400° F. Operating and/or hydrogen pressure is in the range of 1 to 1000 p.s.i.g., preferably 5 to 700 p.s.i.g. Reaction time is in the range of one minute to 10 hours, preferably 5 minutes to 10 hours, in any suitable reactor—either batch or continuous. The hydrogenation process can be carried out to saturate all or part of the double bonds in the polymer being hydrogenated. It is apparent that polymers made with the catalyst systems of the invention can be hydrogenated without intermediate catalyst or solvent separation, simply by the addition of hydrogen and adjustment of temperatures and pressure to the levels favoring hydrogenation. Additional catalyst can be used if desired.

Hydrogenation of 1-olefin polymers greatly increases resistance to warpage in molding and also prevents melt index drop-off during extrusion.

The materials produced by hydrogenation are thermoplastic materials that are useful plastics as such or can be blended with other plastic or elastomeric materials. They are well suited for the preparation of articles by conventional extrusion or compression molding processes and they can also be processed by conventional compounding and vulcanizing techniques, using suitable vulcanizing agents such as peroxides and/or sulfur. Known antioxidants, pigments, dyes, fillers, plasticizers, tackifiers, softeners, accelerators, retarders, accelerator activators, and the like can be used in the compounding. They can be used to make fibers, filaments, dishes, containers, films, sheetings, toys, gaskets, tubing, coating materials, protective coverings, and the like, either alone or in the aforementioned blends. They can also be rolled into sheets, which can be laminated with suitable laminating material. They are particularly suitable for wire coating. Suitably selected hydrogenated polymers can be used to improve dyeability, adhesion, anti-static and permeability properties of other polyolefins by blending therewith.

The hydrogenated polymers can be recovered from the hydrogenation reactor effluent by any suitable means, such as filtration. Another method of removing the catalyst residue from the hydrogenated polymer is to add water to the effluent to precipitate the Group I–A, II–A, or III–A metal and/or the Group VIII metal as a hydroxide. The precipitate can then be removed by filtration, decantation, or the like.

The following examples illustrate details of procedures which may be followed. It is to be understood that these examples are given only for the purpose of illustration and should not be construed to unduly limit the invention in any way.

EXAMPLE I

*Preparation of Group VIII salt*

The nickel salt of diphenylphosphinic acid was prepared by reacting 1 mol of either (a) nickel hydroxide or (b) nickel carbonate with 2 mols of diphenylphosphinic acid in boiling hexadecane for about 30 minutes, cooling, filtering, washing with pentane and drying in a vacuum oven at 3 inches mercury and about 200° F.

EXAMPLE II

The catalyst components prepared in Example I were used to hydrogenate a polyethylene (melt index=28 by ASTM D 1238–62T, Condition E; density=0.965 by ASTM D1505–63T) made by the process of U.S. 2,825,721 with a chromium oxide catalyst and having 1 terminal vinyl group per 1000 carbon atoms, at a temperature of 300° F., using a reductant (Group I–A, II–A, or III–A metal or metal compound) to nickel mol ratio of 4:1. For these tests 40 grams of polymer were dissolved in 600 grams of cyclohexane.

The following results were obtained:

| Run No. | Material hydrogenated | Ni, p.p.m. | Time, Hr. | H₂ press, p.s.i.g. | Reductant | Remarks |
| --- | --- | --- | --- | --- | --- | --- |
| 1 | Polyethylene | 400 | 1 | 20 | TEA[1] | 0.6 trans internal and 0.3 terminal vinyl groups per 1,000 C atoms. |
| 2 | do | 375 | 1 | 300 | TEA | 0.3 trans internal group per 1,000 C atoms. |
| 3 | do | 300 | 2.5 | 300 | TEA | 100% hydrogenation. |
| 4 | do | 300 | 1 | 300 | TDA[2] | Do. |

[1] Triethylaluminum.
[2] Tridecylaluminum.

The nickel salt employed in Runs 1–3 was prepared according to (a) of Example I; that used in Run 4 was prepared according to (b) of Example I.

The amount of hydrogenation obtained in the runs was determined by infrared examination of the product.

The above data clearly demonstrate effective hydrogenation of the polymer unsaturation is obtained by the process of this invention.

I claim:

1. A method for hydrogenating unsaturated polymers and copolymers of 1-olefins which comprises contacting said polymers with hydrogen in the presence of a two-component catalyst in a suitable hydrocarbon solvent wherein the first component of said catalyst is selected from the group consisting of a metal, metal hydride or organometal compound of Groups I–A, II–A, or III–A and the second component is a Group VIII metal salt of a hydrocarbon-substituted phosphorus acid of the formulae:

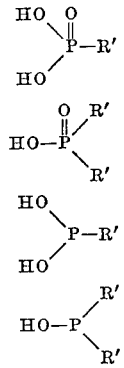

wherein R is a member of the group consisting of alkyl, cycloalkyl, and aryl groups having 1 to 20 carbon atoms.

2. A method according to claim 1 wherein the hydrogenation is carried out at a temperature in the range of 100 to 500° F. for a period of from 1 minute to 20 hours.

3. A method according to claim 1 wherein the mol ratio of reductant to the metal in the metal salt is in the range of 1:1 to 10:1.

4. A method according to claim 1 wherein said 1-olefin compound is polyethylene.

5. A method according to claim 1 wherein said catalyst is triethylaluminum and nickel diphenylphosphinate.

6. A process according to claim 5 wherein the hydrogenation is carried out in cyclohexane.

7. A hydrogenation catalyst consisting of a mixture of a compound of the formula MR$_m$, wherein M is a Group I–A, II–A, or III–A metal of the Periodic System shown on page B–2 of the Handbook of Chemistry and Physics, 45th Edition, published by the Chemical Rubber Company in 1964, R is selected from the group consisting of hydrogen, aryl, cycloalkyl, or alkyl groups, or combinations thereof, such as alkaryl, aralkyl, and the like, having 1 to 20 carbon atoms, and $m$ is either zero or the valence of M, and a Group VIII metal salt of a compound selected from those of the formulae:

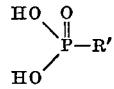

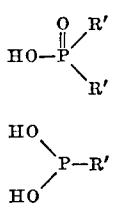

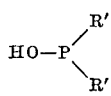

wherein R is a member of the group consisting of alkyl, cycloalkyl and aryl groups having 1 to 20 carbon atoms.

8. A catalyst according to claim 7 wherein said compound is triethylaluminum and said Group VIII metal salt is nickel diphenylphosphinate.

9. A catalyst according to claim 7 wherein said compound is tridecylaluminum.

References Cited

UNITED STATES PATENTS 2,825,721   3/1958   Hogan et al. _____ 260—88.1
3,205,278   9/1965   Laporte _____ 260—690

JOSEPH L. SCHOFER, *Primary Examiner.*

LAWRENCE EDELMAN, *Assistant Examiner.*

U.S. Cl. X.R.

252—437; 260—88.2, 93.7, 690